United States Patent Office 3,309,357
Patented Mar. 14, 1967

3,309,357
D-GLUCOPYRANO-IMIDAZOLIDINES
Charles J. Morel, Arlesheim, Basel-Land, and Oskar Wasker, Binningen, Basel-Land, Switzerland, assignors to Geigy Chemical Corporation, Greenburgh, N.Y., a corporation of Delaware
No Drawing. Filed June 4, 1965, Ser. No. 461,548
Claims priority, application Switzerland, Mar. 18, 1963, 3,376/63, 3,377/63; June 11, 1964, 7,641/64; Sept. 16, 1964, 12,039/64
18 Claims. (Cl. 260—211.5)

This application is a continuation-in-part of our pending patent application Ser. No. 352,338, filed Mar. 16, 1964 and now abandoned.

The present invention concerns new imidazole derivatives and their salts having valuable pharmacological properties, as well as a process for the production thereof.

More in particular, this invention relates, in a first aspect to compounds of the formula

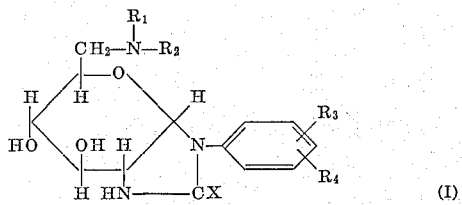

wherein $R_1$ represents hydrogen, lower alkyl or di-lower alkylaminoalkyl,
$R_2$ represents hydrogen or lower alkyl, and
$R_1$ and $R_2$ when taken together with the nitrogen atom to which they are attached represent piperidino, pyrrolidino, morpholino, and hexamethyleneimino,
$R_3$ represents lower alkyl, lower alkoxy, chlorine, bromine, fluorine, nitro or trifluoromethyl,
$R_4$ represents hydrogen, lower alkyl or chlorine, and
X represents oxygen or sulfur, which have valuable pharmacological properties and are distinguished from known deoxy-glucopyrano-imidazolidines by analgesic activity, both on parenteral application in the form of aqueous solutions of their salts with inorganic or organic acids as well as on oral application as free bases or as salts.

Moreover, these compounds also possess antiphlogistic and antipyretic activities. In contrast thereto, known imidazolidines differing from the compounds of Formula I by a hydroxyl group in 6"-position have no significant analgesic activity. Application of compounds according to the invention is, therefore, indicated particularly in the case of inflammatory diseases accompanied by pain.

In the compounds of Formula I, $R_1$ represents more in detail, besides hydrogen, for example, methyl, ethyl, n-propyl, isopropyl, n-butyl, isobutyl or sec. butyl, β-dimethylaminoethyl, β-diethylaminoethyl, β-dimethylaminopropyl, β-diethylaminopropyl, γ-dimethylaminopropyl, γ-diethylaminopropyl or γ-dimethylamino-β-methyl-propyl. $R_2$ represents, for example, hydrogen or one of the lower alkyl radicals mentioned above. Also, $R_1$ and $R_2$, together with the adjacent nitrogen atom, can form a heterocycle, e.g. the 1-pyrrolidinyl, piperidino, hexamethyleneimino or morpholine radical.

$R_3$ represents, for example, the methyl, ethyl, isopropyl, tert. butyl, methoxy, ethoxy, n-propoxy, isopropoxy or n-butoxy radical, a fluorine, chlorine or bromine atom, or a nitro or trifluoromethyl group, and $R_4$ is hydrogen or one of the alkyl or alkoxy radicals or halogen atoms given for $R_3$.

The compounds of Formula I in which X is sulfur are distinguished from those in which X represents oxygen by a particularly pronounced antiphlogistic component in their pharmacodynamic spectrum.

Preferred for the above reason and good accessibility are the compounds of the formula

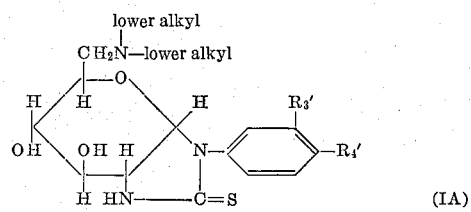

and the non-toxic, pharmaceutically acceptable acid addition salts thereof, in which formula Each of $R_3'$ and $R_4'$ is a member selected from the group consisting of methyl and chlorine.

In order to produce compounds of Formula I, an ester is formed by esterification of the primary hydroxyl group at the $C_6$ atom of the hexose radical of a compound of the formula

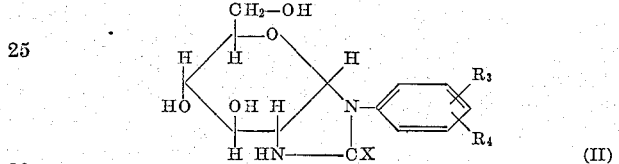

wherein X, $R_3$ and $R_4$ have the meanings given above, with an acid defined below, suitable for rendering said ester reactive with amines, and then reacting the said "amine-reactive" ester with a compound of the formula

wherein $R_1$ and $R_2$ have the meanings given above, the reaction being performed in the presence of an acid binding agent. Preferably an excess of the compound of Formula III itself serves as the acid binding agent. At the same time, this compound of Formula III can also serve as the sole reaction medium. However, the reactions with particularly easily volatile starting amines falling under Formula III or with those having a high boiling point are more advantageously performed in the presence of an inert organic solvent. Lower alkanols and lower alkoxyalkanols, for example, are suitable as such solvents. The reactions are preferably performed at moderately raised temperatures, e.g., between about 20°, or 40° and 120° C. and, when using low-boiling starting materials of Formula III, in an autoclave.

Because of the ease with which they are produced, particularly sulfonic acid esters such as p-toluene sulfonic acid ester and methane sulfonic acid ester are suitable as "amine-reactive" esters obtained from compounds of Formula II. They are produced, for example, by reacting compounds of Formula II with equimolar amounts of the corresponding sulfo-chlorides in pyridine, the reaction being performed at low temperatures, preferably at initial temperatures below 0° C. which are gradually raised to room temperature or a little thereabove to complete the reaction.

Compounds of Formula II are, in turn, produced by a process described in French Patent No. 1,317,595. This process consists in reacting D-glucosamine at elevated temperature with phenyl mustard oil or phenyl isocyanate which may be substituted as defined for $R_3$ and $R_4$. In this reaction, ethanol is used, for example, as solvent for phenyl mustard oils and dimethyl formamide or pyridine are used, for example, as solvents for phenyl isocyanates. The reaction product thus obtained is then subjected to ring closing conditions, e.g., by adding a small amount of sulfuric acid to the reaction solution containing the product and continuing boiling for a short time, or by isolating the reaction product, for example, by evaporation of the reaction solution and then heating it with aqueous, preferably 20%, acetic acid to about 95–100° C. The resulting compound of Formula II can be isolated, after removal of any remaining sulfuric acid, by evaporation of the reaction solution and recrystallization of the residue, e.g., from water or ethanol/water. A further process for the production of starting materials of Formula II is described in British Patent No. 924,985, in which physical data for numerous starting materials are given.

Examples of starting compounds of Formula III are ammonia, methylamine, ethylamine, n-propylamine, isopropylamine, n-butylamine, isobutylamine, dimethylamine, N-methyl-ethylamine, diethylamine, di-n-propylamine, di-n-butylamine, pyrrolidine, piperidine, hexamethyleneimine, morpholine, N,N-dimethylethylenediamine, N,N,N'-trimethylethylenediamine, N,N-diethylethylenediamine, N,N-dimethylpropylenediamine, N,N-dimethyltrimethylenediamine, N,N-diethyltrimethylenediamine, N,N,N'-trimethyltrimethylenediamine and N,N,β-trimethyltrimethylenediamine.

Another process for the production of those compounds falling under Formula I wherein $R_1$ and $R_2$ are hydrogen atoms and $R_3$, $R_4$ and X have the meanings given above, consists in reacting an "amine-reactive" ester of the type described above with a salt of hydrazoic acid, in particular with sodium azide, the reaction being performed in an inert solvent such as dimethyl sulfoxide or dimethyl formamide, at a moderately raised temperature, e.g., between 60 and 100° C., thereby producing the corresponding azido compound, and reducing the latter to a primary amine with one of the usual reducing agents, e.g., hydrogen, in the presence of a hydrogenation catalyst in an inert solvent at room temperature while splitting off nitrogen. Suitable catalysts are, for instance, Raney nickel or palladium, the latter especially on a carrier such as charcoal or aluminum oxide, and suitable solvents are, e.g., methanol, ethanol or propanol.

The compounds of Formula I form monoacid salts with inorganic and organic acids and, if $R_1$ has a basic character, they also form di-acid salts. Pharmocologically acceptable acids are those acids which are suitable for forming salts of the compounds of Formula I, according to the invention, which cause no toxic symptoms when applied in the dosages conventional in the therapeutic applications of such agents. Provided the salts do not crystallize more readily than the free bases, aqueous solutions of the salts are produced preferably by dissolving corresponding amounts of the free bases and acids in water. Examples of acids suitable for formation of non-toxic, pharmaceutically acceptable salts are: hydrochloric acid, hydrobromic acid, sulfuric acid, phosphoric acid, methane sulfonic acid, ethane sulfonic acid, ethane disulfonic acid, β-hydroxyethane sulfonic acid, acetic acid, succinic acid, fumaric acid, maleic acid, lactic acid, malic acid, tartaric acid, citric acid, benzoic acid, salicylic acid and mandelic acid.

In a second aspect, this invention relates to compounds of the formula

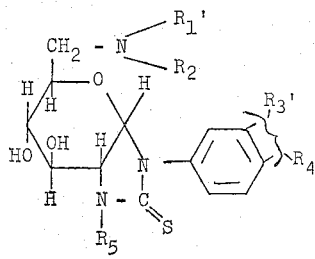

(I')

wherein $R_1'$ represents hydrogen, lower alkyl or di-lower alkylamino-lower alkyl, $R_2$ represents hydrogen or lower alkyl, $R_1'$ and $R_2$ when taken together with the nitrogen atom to which they are attached, represent piperidino, pyrrolidino, hexamethyleneimino, or morpholino, $R_3'$ represents lower alkyl, lower alkoxy, halogen not exceeding an atomic number of 35, or trifluoromethyl, $R_4$ represents hydrogen, lower alkyl or halogen, especially chlorine, and $R_5$ represents lower alkyl, preferably of from 1 to 3 carbon atoms, and their salts with inorganic and organic acids, have valuable pharmacological properties, in particular analgesic activity both on parenteral administration in the form of aqueous solutions of their salts with inorganic or organic acids as well as on oral administration as free bases or as salts. The compounds of Formula I' also possess antiphlogistic and antipyretic activities. This analgesic activity is generally even stronger than that of the compounds of Formula I.

In the compounds of Formula I', $R_1'$ is, for example, hydrogen, a lower alkyl radical such as the methyl, ethyl, n-propyl, isopropyl, n-butyl, isobutyl or sec. butyl radical, or a lower dialkylaminoalkyl radical such as the β-dimethylamino-ethyl, β-diethylamino-ethyl, β-dimethylamino-propyl, β-diethylamino-propyl, γ-dimethylamino-propyl, γ-diethylamino-propyl or γ-dimethylamino-β-methyl-propyl radical. $R_2$ is, for example, hydrogen or one of the alkyl radicals given above. $R_3'$ is, for example, the methyl, ethyl, isopropyl, tert. butyl, methoxy, ethoxy, n-propoxy, isopropoxy or n-butoxy radical, a fluorine, chlorine or bromine atom. $R_4$ is hydrogen or one of the alkyl radicals or chlorine, and $R_5$ represents, for example, methyl, ethyl or propyl.

The compounds of Formula I' are produced by reacting a reactive ester which is formed at the primary hydroxyl group at the carbon atom in 6-position of the hexose radical, of a compound of formula

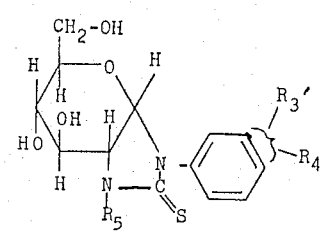

(II')

wherein $R_3'$, $R_4$ and $R_5$ have the meanings given above, with a compound of formula

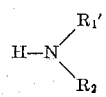

(III')

wherein $R_1'$ and $R_2$ have the meanings given above, the reaction being performed in the presence of an acid binding agent.

The process of making the compound of Formula I' is strictly analogous to that described hereinbefore for the production of the compounds of Formula I, and all details given for the latter process apply correspondingly to making the compounds of Formula I'.

The starting compounds of Formula II' can be produced, in their turn, for example analogously to the process described in French Patent No. 1,317,595, an N-alkyl-D-glucosamine being used as starting material instead of D-glucosamine, which N-alkyl-D-glucosamine is reacted with phenyl mustard oil substituted according to the definition for $R_3'$ and $R_4$, under the conditions described hereinbefore.

Examples of starting materials of Formula II' are, e.g.

obtained from the reaction of 2-methylamino-2-deoxy-α-D-glucose hydrochloride with 3,4-dichlorophenyl isothiocyanate, or with 3-trifluoromethylphenyl isothiocyanate, or with 4-bromo-phenyl isothiocyanate, or with 4-fluorophenyl isothiocyanate, or with 3- or 4-methylphenyl isothiocyanate or 3-chloro-4-methylphenyl isothiocyanate or 3-methyl-4-chloro-phenyl isothiocyanate, or with 4-methoxy-phenyl isothiocyanate, or from the reaction of 2-ethylamino- or 2-n-propyl- or 2-isopropyl- or 2-n-butyl-2-deoxy-α-D-glucose hydrochloride with each of the aforesaid phenyl isothiocyanates, respectively.

Another process for the production of compounds of Formula I' wherein $R_1'$ and $R_2$ are hydrogen atoms and $R_3'$, $R_4$ and $R_5$ have the meaning given above, is the second process described hereinbefore for the production of compounds of Formula I, applied in an analogous manner.

The compounds of Formula I' form monoacid salts with inorganic and organic acids and, if $R_1'$ is of basic character, also diacid salts. Acids affording pharmacologically acceptable salts are particularly suitable for salt formation, these are acids which, in the dosages of the salts usual for therapeutical use, do not give rise to any toxic symptoms. Insofar as the salts have no advantages over the free bases with regard to crystallizability, aqueous solutions of salts are preferably produced by dissolving corresponding amounts of the free bases and acids in water. Examples of acids which can be used for salt formation have been given hereinbefore in connection with the compounds of Formula I.

The new compounds of Formulas I and I' are administered orally, rectally or, in the form of aqueous solutions of their salts, also parenterally. Usual dosage units such as tablets, dragées (sugar coated tablets), suppositories or ampoules preferably contain 25 to 500 mg. of a compound of Formula I or I', or, in aqueous solution, 25–250 mg. of a non-toxic salt thereof, which amounts correspond to daily dosages of 100 to 1000 mg. orally or 50 to 500 mg. parenterally to adult patients.

Dosage units for oral administration preferably contain between 1 and 90% of a compound of Formula I or I' as active ingredient. They are produced by combining the active substance with, e.g. solid, pulverulent carriers such as lactose, saccharose, sorbitol, mannitol; starches such as potato starch, maize starch or amylopectin, also laminaria powder or citrus pulp powder; cellulose derivatives or gelatines, optionally with the addition of lubricants such as magnesium or calcium stearate or polyethylene glycols (carbowaxes) of suitable molecular weights, to form tablets or dragée cores The latter are coated, for example, with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between various dosages of active substance.

Examples of dosage units for rectal administration are suppositories which consist of a combination of a compound of Formula I with a neutral fatty foundation, or also gelatine rectal capsules which contain a combination of a compound of Formula I or I' with polyethylene glycols (carbowaxes) of suitable molecular weight.

Ampoules for parenteral, particularly intramuscular, administration contain a water soluble, non-toxic salt of a compound of Formula I in a concentration of preferably 1–5%, optionally together with suitable stabilizing agents and buffer substances, in aqueous solution. By non-toxic salts of compounds of Formula I or I', there are means salts with those acids which, in the dosages of the salts usual for therapeutical administration, do not give rise to any toxic symptoms.

The following non-limitative examples illustrate the invention further. The temperatures are given therein in degrees centigrade. Percentages are given by weight unless expressly stated otherwise. "Abs." means absolute.

*Example 1*

(a) 7.2 grams (g.) of 2-thiono-3-(3',4'-dichlorophenyl)-4,5-D-glucopyrano-imidazolidine are suspended in 30 milliliters (ml.) of anhydrous pyridine, and 4.2 g. of p-toluene sulfonic acid chloride in 30 ml. of pyridine are added dropwise while stirring at −10° to −8°, under anhydrous conditions. The whole is then stirred for about 5 hours while cooling with ice and then for 14 hours at room temperature (about 20° C.). The clear solution is then poured onto a mixture of ice and water; after the oil which separates out has solidified, it is filtered off under suction, washed with water and recrystallized from ethanol. The tosyl ester thus obtained melts at 176–178°. $[\alpha]_D^{26°}$: +40.0° (c.=1.09 in DMF); (DMF=dimethylformamide).

(b) 10 g. of the tosyl ester obtained under (a) and 50 ml. of diethylamine are refluxed for 6 hours while excluding moisture. After cooling, the diethylamine salt of p-toluene sulfonic acid which precipitates is removed by filtration and the filtrate is concentrated under reduced pressure. The residue is recrystallized twice from aqueous 70%-methanol whereupon 2-thiono-3-(3',4'-dichlorophenyl) - 4,5-(6''-deoxy-6''-diethylamino-D-glucopyrano)-imidazolidine of formula

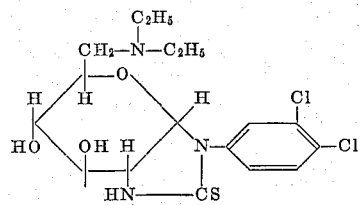

is obtained. M.P. 136–138°, $[\alpha]_D^{23°}$:+54.2° (c.=1.006 in DMF).

The compound can also be obtained as an allotropic modification which melts at 184–186°.

The following compounds falling under Formula I are obtained in the same manner as described in Example 1 by way of the corresponding tosyl esters, using equivalent amounts of other compounds falling under Formula II and produced as described in British Patent No. 924,985 and in French Patent No. 1,317,595, respectively.

Thus, 2 - thiono - 3-(4'-methoxyphenyl)-4,5-(6''-deoxy-6''-diethylamino-D-glucopyrano)imidazolidine, M.P. 147–149° (from isopropanol), $[\alpha]_D^{23°}$:+58.0° (c.=1.09 in DMF), by way of the tosyl ester (M.P. 153–154° from methanol) $[\alpha]_D^{25°}$:+35.90 (c.=1.00 in DMF), 2-thiono-3-(3',4'-dimethylphenyl)-4,5-(6''-deoxy-6''-dimethylamino-D-glucopyrano)-imidazolidine, M.P. 210–211° (from ethanol), $[\alpha]_D^{23°}$:+62.2° (c.=1.00 in DMF), 2-thiono-3-(3',4'-dimethylphenyl)-4,5-(6''-deoxy-6''-diethylamino-D-glucopyrano)-imidazolidine, M.P. 143–145° (from isopropanol), $[\alpha]_D^{23°}$:+59.1° (c.=1.01 in DMF), by way of the tosyl ester (M.P. 155–157° from 50%-ethanol), $[\alpha]_D^{23°}$:+39.2° (c.=1.01 in DMF), 2 - thiono-3-(3'-chloro-4'-methylphenyl)-4,5-(6''-deoxy-6'' - dimethylamino-D-glucopyrano) - imidazolidine, M.P. 205–207° (from 30%-ethanol), $[\alpha]_D^{23°}$:+55.5° (c.=1.04 in DMF), 2 - thiono - 3 - (3'-chloro-4'-methylphenyl)-4,5-(6''-deoxy-6''-diethylamino-D-glucopyrano)-imidazolidine, M.P. 137–138° (from 50%-ethanol), $[\alpha]_D^{25°}$:+55.1° (c.=0.98 in DMF), by way of the tosyl ester (M.P. 168–170°), $[\alpha]_D^{26°}$:+35.8° (c.=1.20 in DMF), 2 - thiono - 3 - (2'-chlorophenyl)-4,5-(6''-deoxy-6''-diethylamino-D-glucopyrano)-imidazolidine, 2 - thiono - 3 - (4'-nitrophenyl)-4,5-(6''-deoxy-6''-dimethylamino-D-glucopyrano)-imidazolidine, 2 - thiono - 3 - (4'-nitrophenyl)-4,5-(6''-deoxy-6''-diethylamino-D-glucopyrano)-imidazolidine, 2 - thiono - 3 - (3',5'-dichlorophenyl)-4,5-(6''-deoxy-6''-dimethylamino-D-glucopyrano)-imidazolidine, 2 - thiono - 3 - (3',5'-dichlorophenyl)-4,5-(6"-deoxy-6"-diethylamino-D-glucopyrano)-imidazolidine.

Moreover,

2 - thiono - 3 - (4'-fluorophenyl)-4,5-(6"-deoxy-6"-dimethylamino-D-glucopyrano)-imidazolidine, 2 - thiono - 3 - (4'-bromophenyl)-4,5-(6"-deoxy-6"-dimethylamino-D-glucopyrano)-imidazolidine, 2 - thiono - 3 - (3'-trifluoromethylphenyl)-4,5-(6"-deoxy-6"-dimethylamino-D-glucopyrano)-imidazolidine, and 2 - thiono - 3 - (3'-trifluoromethylphenyl)-4,5-(6"-deoxy-6"-diethylamino-D-glucopyrano)-imidazolidine are obtained from the following starting materials produced in accordance with the method given in French Patent No. 1,317,595:

2 - thiono - 3 - (4' - fluorophenyl)-4,5-D-glucopyrano-imidazolidine,

2 - thiono - 3 - (4' - bromophenyl)-4,5-D-glucopyrano-imidazolidine, M.P. 242–244° from ethanol/water, $[\alpha]_D^{22°}$: +74.5° (c.=1.12 in DMF), and 2 - thiono - 3 - (3'-trifluoromethylphenyl)-4,5-D-glucopyrano-imidazolidine, M.P. 103–106° (from water, contains 1 mol of crystal water), $[\alpha]_D^{22°}$: +44.7° (c.=1.09 in DMF).

*Example 2*

5 g. of the tosyl ester obtained according to Example 1(a) are refluxed for 3 hours with 5 ml. of aqueous 35%-methylamine solution in 30 ml. of 95%-ethanol. The reaction mixture is then evaporated to dryness in vacuo, the residue is dissolved in hot water and, after adding charcoal, the insoluble oil is filtered off. The filtrate is made alkaline with sodium carbonate solution while it is still warm. After it has completely cooled, the substance which precipitates is filtered off under suction and is recrystallized from water. The 2-thiono-3-(3',4'-dichlorophenyl) - 4,5 - (6" - deoxy - 6" - methylamino-D-glucopyrano)-imidazolidine obtained melts at 179–181° with decomposition. $[\alpha]_D^{23°}$: +58.0° (c.=1.06 in DMF).

*Example 3*

16 g. of the tosyl ester obtained as described in Example 1(a) in 200 ml. of anhydrous ethanol and 20 ml. of dimethylamine are refluxed for 14 hours while excluding moisture. The reaction solution is concentrated under reduced pressure, the residue is taken up in 1 N-hydrochloric acid and the acid solution is washed twice with ether. The aqueous phase is then made alkaline with sodium hydrogen carbonate and then extracted twice with chloroform. The chloroform solutions are combined, dried over sodium sulfate and concentrated under reduced pressure. The residue is recrystallized twice from 50%-ethanol whereupon 2-thiono-3-(3',4'-dichlorophenyl) - 4,5 - (6" - deoxy - 6" - dimethylamino-D-glucopyrano)-imidazolidine is obtained. M.P. 195–197°, $[\alpha]_D^{25°}$: +59.8° (c.=1.0 in DMF).

On using the corresponding amines, the following compounds are obtained in an analogous manner:

2-thiono-3-(3',4'-dichlorophenyl)-4,5-(6"-deoxy-6"-amino-D-glucopyrano)-imidazolidine, 2-thiono-3-(3',4'-dichlorophenyl)-4,5-(6"-deoxy-6"-pyrrolidino-D-glucopyrano)-imidazolidine, 2-thiono-3-(3',4'-dichlorophenyl)-4,5-(6"-deoxy-6"-morpholino-D-glucopyrano)-imidazolidine, 2-thiono-3-(3',4'-dichlorophenyl)-4,5-[6"-deoxy-6"-(β-dimethylamino-ethylamino)-D-glucopyrano]-imidazolidine, 2-thiono-3-(3',4'-dichlorophenyl)-4,5-(6"-deoxy-6"-hexamethyleneimino-D-glucopyrano)-imidazolidine, 2-thiono-3-(3',4'-dichlorophenyl)-4,5-(6"-deoxy-6"-piperidino-D-glucopyrano)-imidazolidine, 2-thiono-3-(3',4'-dichlorophenyl)-4,5-(6"-deoxy-6"-di-n-propylamino-D-glucopyrano)-imidazolidine.

Also, by reacting the tosyl ester of 2-thiono-3-(4'-chlorophenyl) - 4,5 - glucopyrano - imidazolidine M.P. 166–168°, $[\alpha]_D^{24°}$: +37.5° (c.=1.02 in DMF) produced analogously to Example 1 with diethylamine, 2-thiono-3-(4'-chlorophenyl)-4,5-(6"-deoxy-6"-diethylamino-D - glucopyrano)-imidazolidine is obtained, M.P. 186–188° (from alcohol/water), $[\alpha]_D^{25°}$: 57.2° (c.=1.03 in DMF), and, with dimethylamine, 2-thiono-3-(4'-chlorophenyl)-4,5 - (6" - deoxy - 6" - dimethylamino - D - glucopyrano)-imidazolidine, M.P. 222–224° (from ethanol) $[\alpha]_D^{23°}$: +58.6° (c.=1.01 in DMF) is obtained.

*Example 4*

(a) 1.75 g. of 2-oxo-3-(3',4'-dichlorophenyl)-4,5-D-glucopyrano-imidazolidine are suspended in 8 ml. of anhydrous pyridine and 1.05 g. of p-toluene sulfonic acid chloride in 8 ml. of pyridine are added dropwise while stirring at −10° to −8° while excluding moisture. The reaction mixture is stirred for about 5 hours while cooling with ice and then for 14 hours at room temperature. It is then poured onto a mixture of ice and water and, after the reaction product which separates out has solidified, the latter is separated by suction filtration, washed with water and recrystallized from benzene to which a few drops of ethanol have been added. After again recrystallizing from ethanol, the pure tosyl ester is obtained which has a melting point of 95–98°. $[\alpha]_D^{26°}$: +109.1° (c.=1.01 in DMF).

(b) 0.5 g. of the tosyl ester obtained above are refluxed with 5 ml. of diethylamine for 6 hours while excluding moisture. The reaction mixture is cooled; the diethylamine salt of p-toluene sulfonic acid which precipitates is filtered off and washed with diethylamine. The filtrate is concentrated under reduced pressure and the residue is recrystallized from water. The 2-oxo-3-(3',4'-dichlorophenyl)-4,5-(6"-deoxy-6" - diethylamino)-D-glucopyrano-imidazolidine obtained melts at 150–151°. $[\alpha]_D^{26°}$: +120.3° (c.=0.99 in DMF).

The following compounds falling under Formula I are obtained in an analogous manner by way of the corresponding tosyl esters by using compounds of Formula II produced as described in British Patent No. 824,985 and French Patent No. 1,317,595:

2-oxo-3-(3',4'-dimethylphenyl)-4,5-(6"-deoxy-6"-diethylamino-D-glucopyrano)-imidazolidine, 2-oxo-3-(4'-methoxyphenyl)-4,5-(6"-deoxy-6"-diethylamino-D-glucopyrano)-imidazolidine, 2-oxo-3-(4'-chlorophenyl)-4,5-(6"-deoxy-6"-diethylamino-D-glucopyrano)-imidazolidine, 2-oxo-3-(3',4'-dichlorophenyl)-4,5-(6"-deoxy-6"-dimethylamino-D-glucopyrano)-imidazolidine, 2-oxo-3-(4'-methylphenyl)-4,5-(6"-deoxy-6"-diethylamino-D-glucopyrano)-imidazoline, 2-oxo-3-(3'-chloro-4'-methylphenyl)-4,5-(6"-deoxy-6"-diethylamino-D-glucopyrano)-imidazolidine, 2-oxo-3-(2'-chlorophenyl)-4,5-(6"-deoxy-6"-diethylamino-D-glucopyrano)-imidazolidine, 2-oxo-3-(4'-nitrophenyl)-4,5-(6"-deoxy-6"-dimethylamino-D-glucopyrano)-imidazolidine, 2-oxo-3-(4'-nitrophenyl)-4,5-(6"-deoxy-6"-diethylamino-D-glucopyrano)-imidazolidine, 2-oxo-(3',5'-dichlorophenyl)-4,5-(6"-deoxy-6"-dimethylamino-D-glucopyrano)-imidazolidine, 2-oxo-(3',5'-dichlorophenyl)-4,5-(6"-deoxy-6"-diethylamino-D-glucopyrano)-imidazolidine, and 2-oxo-3-(4'-bromophenyl)-4,5-(6"-deoxy-6"-diethylamino-D-glucopyrano)-imidazolidine which is obtained from 2-oxo-3-(4'-bromophenyl)-4,5-D-glucopyrano-imidazolidine (M.P. 227–229° from water), $[\alpha]_D^{22°}$: +137.9° (c.=1.0 in DMF), which latter is produced by the method described in French Patent No. 1,317,595.

Example 5

(a) 26 g. of the tosyl ester obtained as described in Example 1(a) are dissolved in 100 ml. of dimethyl sulfoxide. 10 g. of sodium azide are added and the reaction mixture is stirred for 15 minutes at 95–100°. The contents of the flask are stirred into about 500 ml. of a mixture of ice and water, the azide which precipitates is filtered off under suction and well washed with water. It is then recrystallized from 50%-ethanol. 2-thiono-3-(3',4'-dichlorophenyl)-4,5-(6"-deoxy-6"-azido - D - glucopyrano)-imidazolidine is obtained. M.P. 182–184°, $[\alpha]_D^{24°}$: +142.9° (c.=1.06 in DMF).

The compound can also be obtained as an allotropic modification which melts at 156–158°.

(b) 14.5 g. of the above azide are dissolved in 350 ml. of ethanol, 10 g. of Raney nickel are added and hydrogen is bubbled through at room temperature for 3 hours. The primary amine begins to separate out towards the end of the hydrogenation. After the hydrogenation is completed, the mixture is heated to 40–50°, the catalyst is filtered off and the filtrate is concentrated to about half its volume. It is allowed to crystallize and 2-thiono-3-(3',4' - dichlorophenyl) - 4,5 - (6" - deoxy - 6" - amino-D-glucopyrano)-imidazolidine described in Example 2, is obtained. (M.P. 195–196°, from ethanol), $[\alpha]_D^{25°}$: +71.30 (c.=1.03 in DMF).

Starting from other tosyl esters used in Examples 1 and 3, the following compounds are obtained in an analogous manner:

2-thiono-3-(4'-chlorophenyl)-4,5-(6"-deoxy-6"-amino-D-glucopyrano)-imidazolidine, 2-thiono-3(3',4'-dimethylphenyl)-4,5-(6"-deoxy-6"-amino-D-glucopyrano)-imidazolidine, 2-oxo-3-(3',4'-dichlorophenyl)-4,5-(6"-deoxy-6"-amino-D-glucopyrano)-imidazolidine, and 2-oxo-3-(3',4'-dimethylphenyl)-4,5-(6"-deoxy-6"-amino-D-glucopyrano)-imidazolidine.

Example 6

(a) 36.5 g. of 2-thiono-3-(3',4'-dichlorophenyl)-4,5-D-glucopyrano-imidazolidine are dissolved in 100 ml. of anhydrous pyridine. The solution is cooled to −10° and, at this temperature, a mixture of 14 g. of methane sulfonic acid chloride and 50 ml. of anhydrous pyridine is added dropwise while stirring. The temperature is then allowed to rise to 0° within 4 hours, whereupon the reaction mixture is poured into a mixture of ice and water. The mixture obtained is extracted with ethyl acetate, the organic solution is washed with water, dried over sodium sulfate and concentrated in vacuo. The methane sulfonic acid ester which remains can be further worked up without further purification.

(b) 5 g. of the 2-thiono-3-(3',4'-dichlorophenyl)-4,5-(6" - deoxy - 6" - methane sulfonyloxy-D-glucopyrano)-imidazolidine obtained according to (a) are dissolved in 20 ml. of ethanol, 3.0 ml. of dimethylamine are added and the mixture is refluxed for 3 hours. After cooling, it is concentrated in vacuo, the residue is dissolved in 1 N-hydrochloric acid and the hydrochloric acid solution is washed with chloroform and with ether. It is then made alkaline with sodium carbonate solution and the substance which precipitates is filtered off under suction and recrystallized from aqueous 50%-ethanol. The 2-thiono-3-(3',4' - dichlorophenyl) - 4,5 - (6" - deoxy - 6" - dimethylamino-D-glucopyrano)-imidazolidine obtained is identical with the product obtained according to Example 3.

Example 7

1.16 g. of fumaric acid (0.01 mol) are dissolved in 50 ml. of anhydrous isopropanol. A previously heated solution of 8.4 g. (0.02 mol) of 2-thiono-3-(3',4'-dichlorophenyl) - 4,5 - (6" - deoxy - 6" - diethylamino - D - glucopyrano)-imidazolidine in 20 ml. of anhydrous isopropanol is then added dropwise to the fumaric acid solution which is under reflux. The whole is then stirred for another hour at the same temperature. On cooling, the fumarate separates first in a greasy form which gradually becomes solid. It is filtered off under suction and recrystallized from anhydrous isopropanol. The hygroscopic crystals melt at 124–128°, $[\alpha]_D^{26°}$: +60.5° (c.=1.06 in DMF).

The hydrochloride of the above base produced analogously, using anhydrous ethanol as solvent, melts at 157–159° with decomposition (from ethanol/ether), $[\alpha]_D^{23°}$: −9.9° (c.=1.05 in DMF).

The following salts of 2-thiono-3-(3',4'-dichlorophenyl) - 4,5 - (6" - deoxy - 6" - dimethylamino - D-glucopyrano)-imidazolidine are also obtained analogously:

hydrochloride, M.P. 193–195° with decomposition (from ethanol/ether), as an amorphous yellow powder which is strongly hygroscopic, $[\alpha]_{DD}^{23°}$: −4.8° (c.=0.81 in water);

fumarate, M.P. 155° with decomposition, after sintering at 149° (from isopropanol/water, white hygroscopic crystals), $[\alpha]_D^{23°}$: +63.1° (c.=1.04 in DMF).

Example 8

(a) 2.3 g. of 2-methylamino-2-deoxy - α - D - glucose hydrochloride [F. A. Kuehl, Jr. et al., J. Am. Chem. Soc. 69, 3032 (1947)] are dissolved in 5 ml. of cold water, 5 ml. of 1 N sodium hydroxide solution are added and the volume of this solution is then made up to 60 ml. with ethanol. 2.1 g. of 3,4-dichlorophenyl isothiocyanate are then added and the solution is refluxed for 30 minutes. At the end of this time, 25 ml. of 20% acetic acid are added to the reaction solution which is then refluxed for 1 hour and then concentrated in vacuo at 40°. The residue is recrystallised from 50% ethanol. After drying the crystals for 14 hours at 60° under high vacuum over phosphorus pentoxide, 1-methyl - 2 - thiono-3-(3',4'-dichlorophenyl)-4,5 - D-glucopyrano - imidazolidine is obtained as the semi-hydrate which melts at 91–93°. $[\alpha]_D^{23}$ +40.1° (c.=1.03 in DMF).

The following compounds are obtained in an analogous way on using the corresponding isothiocyanates:

1 - methyl - 2 - thiono - 3-(3',4'-dimethylphenyl)-4,5-D-glucopyrano-imidazolidine, M.P. 201–202° from 50% methanol), $[\alpha]_D^{22}$: +46.0° (c.=1.05 in DMF);

1 - methyl - 2 - thiono - 3 - (4' - methylphenyl) - 4,5 - D-glucopyrano-imidazolidine, M.P. 175.5–176.5° (from water), $[\alpha]_D^{23}$: +38.9° (c.=1.05 in DMF);

1-methyl-2-thiono-3-(3'-chloro-4'-methyl - phenyl) - 4,5-D-glucopyrano-imidazolidine, M.P. 159–160° (from water, $[\alpha]_D^{22}$: +46.9° (c.=0.97 in DMF);

1 - methyl - 2-thiono-3-(3'-trifluoromethyl-phenyl)-4,5-D-glucopyrano-imidazolidine.

(b) 1.9 g. of the semi-hydrate obtained according to (a) are dissolved in 10 ml. of abs. pyridine and then 1.34 g. of p-toluene sulphonic acid chloride dissolved in 10 ml. of abs. pyridine are added dropwise while stirring at −10° and excluding moisture. The mixture is then stirred for 4 hours at 0° and afterwards for 14 hours at room temperature. The clear solution is then poured onto a mixture of ice and water and the oil which separates is extracted with chloroform. The chloroform solution is washed with water, dried over sodium sulphate and concentrated in vacuo at 30°. The residue crystallises from 50% methanol whereupon 1-methyl-2-thiono-3 - (3',4' - dichlorophenyl) - 4,5 - (6" - O-tosyl-D-glucocomposition); $[\alpha]_D^{23°}$: +20.0° (c.=1.07 in DMF). composition); $[\alpha]_D^{23}$: +20.0° (c.=1.07 in DMF).

The corresponding tosyl esters are obtained analogously by reacting 1-methyl-2-thiono-3-(3',4'-dimethylphenyl)-4,5-D-glucopyrano-imidazolidine, or 1-methyl-2-thiono-3-(4'-methylphenyl)-4,5-D-glucopyrano - imidazolidine and 1 - methyl - 2 - thiono-3-(3'-chloro-4-methylphenyl)-4,5-D-glucopyrano-imidazolidine with p-toluene sulphonic acid chloride (20% excess) in abs. pyridine:

1-methyl-2-thiono - 3 - (3',4'-dimethylphenyl)-4,5-(6''-O-tosyl - D - glucopyrano)-imidazolidine, M.P. 141–142° (decomposition, from 50% methanol), $[\alpha]_D^{23}$: +11.2° (c.=1.05 in DMF);

1-methyl-2-thiono-3-(4'-methylphenyl)-4,5-(6'' - O-tosyl-D-glucopyrano)-imidazolidine, M.P. 136.5–137.5° (decomposition, from 50% methanol), $[\alpha]_D^{22}$: +9.0° (c.=1.05 in DMF);

1-methyl-2-thiono - 3 - (3'-chloro-4'-methylphenyl)-4,5-(6'' - O - tosyl - D - glucopyrano) - imidazolidine, M.P. 138–139° (decomposition, from 50% methanol), $[\alpha]_D^{21}$: +17.0° (c.=1.04 in DMF);

1 - methyl-2-thiono-3-(3'-trifluoromethyl - phenyl) - 4,5-(6''-O-tosyl-D-glucopyrano)-imidazolidine.

(c) 12.6 g. of the tosyl ester obtained according to (b) and 25 ml. of dimethylamine in 100 ml. of ethanol are refluxed for 15 hours. The reaction mixture is then cooled, concentrated in vacuo at 40° and the residue obtained is taken up in 300 ml. of 1 N hydrochloric acid. The hydrochloric acid solution is washed with chloroform and ether, then made alkaline with saturated sodium carbonate solution and the oil which separates is taken up in chloroform. After drying and concentrating the chloroform extract in vacuo, a residue is obtained which crystallises from 50 % methanol. The 1-methyl-2-thiono-3-(3',4'-dichlorophenyl) - 4,5 - (6''-deoxy-6''-dimethyl-amino-D-glucopyrano)imidazolidine so obtained melts at 162–163°. $[\alpha]_D^{23}$: +31.5° (c.=1.07 in DMF).

The following compounds are obtained on reaction of the tosyl esters produced analogously to (b) with the corresponding amines:

1 - methyl - 2 - thiono-3-(3',4'-dimethylphenyl)1,5-(6''-deoxy-6''-dimethylamino - D - glucopyrano)-imidazolidine, M.P. 162–163° (decomposition, from water), $[\alpha]:+_D^{24}$: +28.6° (c.=1.01 in DMF);

1-methyl-2-thiono-3-(4'-methylphenyl)-4,5 - (6'' - deoxy-methylamino-D-glucopyrano)-imidazolidine;

1-methyl - 2 - thiono-3-(3'-chloro-4'-methylphenyl)-4,5-(6''-deoxy-6''-dimethylamino-D - glucopyrano) - imidazolidine;

1-methyl-2-thiono-3-(3'-trifluoromethyl-phenyl)4,5 - (6''-deoxy - 6'' - dimethylamino-D-glucopyrano)-imidazolidine.

*Example 9*

(a) 2.0 g. of 2-ethylamino-2-deoxy-α-D-glucose [J. F. Carson, J. Am. Chem. Soc., 77, 5957 (1944)] are suspended in 20 ml. of abs. ethanol, 2.01 g. of 3,4-dichlorophenyl isothiocyanate are added and the mixture is refluxed for 30 minutes whereupon a complete solution is obtained. The clear yellow solution is concentrated in vacuo at 30° and the solid residue is heated for 1 hour on a boiling water bath with 5 ml. of 20% acetic acid. The acetic acid solution obtained is then decoloured with active charcoal and the reaction product is left to crystallise out. After filtering it off under suction and recrystallising from 50% ethanol, 1-ethyl-2-thiono-3-(3',4' - dichlorophenyl)-4,5-D-glucopyrano - imidazolidine is obtained as needles which melt at 161–163°. (Dried for 15 hours at 100° under high vacuum over phosphorus pentoxide.) $[\alpha]_D^{24}$: +33.9° (c.=1.07 in DMF).

On using the corresponding isothiocyanates, the following compounds are obtained in an analogous manner:

1-ethyl-2-thiono-3-(4'-chlorophenyl)-4,5-D - glucopyrano-imidazolidine, M.P. 126.5–127.5° (from 50% methanol), $[\alpha]_D^{22}$: +32.6° (c.=1.09 in DMF);

1-ethyl-2-thiono-3-(4'-methoxyphenyl)-4,5-D - glucopyrano-imidazolidine, M.P. 142–143° (from water), $[\alpha]_D^{23}$: +29.6° (c.=1.08 in DMF)

(b) 14.75 g. of the reaction product obtained according to (a) are dissolved in 60 ml. of abs. pyridine and 10.1 g. of p-toluene sulphonic acid chloride (20% excess) in 60 ml. of abs. pyridine are added dropwise while stirring at −10° while excluding moisture. The reaction mixture is stirred for 4 hours at 0° and then for 14 hours at room temperature. The clear solution is then poured onto a mixture of water and ice and the oil which separates is extracted with chloroform. The chloroform solution is washed with water, dried over sodium sulphate and concentrated in vacuo at 30°. Crystallisation of the residue from 50% methanol yields 1-ethyl-2-thiono-3-(3',4'-dichlorophenyl)-4,5-(6''-O-tosyl-D-glucopyrano)-imidazolidine which melts at 148–148° (decomposition).

$[\alpha]_D^{23}$: +12.5° (c.=1.04 in DMF)

The corresponding tosyl esters are obtained analogously on reaction of 1-ethyl-2-thiono-3-(4'-chlorophenyl)-4,5 - D-glucopyrano-imidazolidine or 1-ethyl-2-thiono-3-(4'-methoxyphenyl) - 4,5 - D-glucopyrano-imidazolidine with p-toluene sulphonic acid chloride (30% excess) in abs. pyridine:

1-ethyl-2-thiono-3-(4'-chlorophenyl)-4,5-(6''-O-tosyl - D-glucopyrano) - imidazolidine, M.P. 135–136° (decomposition, from 50% methanol), $[\alpha]_D^{23}$: +8.3° (c.=1.05 in DMF)

1-ethyl-2-thiono-3-(4'-methoxyphenyl)-4,5-(6''-O - tosyl D-glucopyrano)-imidazolidine, M.P. 127.5–128.5° (decomposition, from 50% methanol), $[\alpha]_D^{22}$: +3.5° (c.=0.98 in DMF)

(c) 4.0 g. of the tosyl ester obtained according to (b) are refluxed with 10 ml. of dimethylamine in 25 ml. of ethanol for 6 hours. The reaction mixture is then cooled, concentrated in vacuo at 40° and the oily residue which remains is extracted with 200 ml. of 1 N hydrochloric acid. The hydrochloric acid solution is washed with chloroform and ether, then made alkaline with saturated sodium carbonate solution and the oil which separates is taken up in chloroform. After drying and concentrating the chloroform extract in vacuo, a residue is obtained which crystallises from 50% ethanol. The 1-ethyl-2-thiono-3-(3',4'-dichlorophenyl) - 4,5 - (6''-deoxy-6''-dimethylamino - D - glucopyrano)-imidazolidine obtained melts at 165–167°.

$[\alpha]_D^{23}$: +27.7° (c.=1.02 in DMF)

On reacting the tosyl esters obtained according to (b) with diethylamine, the following compounds are obtained in an analogous manner:

1-ethyl-2-thiono-3-(3',4'-dichlorophenyl)-4,5-(6'' - deoxy-6''-diethylamino-D-glucopyrano)-imidazolidine, M.P. 98–99° (from 50% methanol), $[\alpha]_D^{24}$: +32.9° (c.=1.055 in DMF)

1-ethyl-2-thiono-3-(4'-chlorophenyl)-4,5-(6''-deoxy - 6''-diethylamino-D-glucopyrano)-imidazolidine;

1-ethyl-2-thiono-3-(4'-methoxyphenyl)-4,5 - (6'' - deoxy-6''-diethyl-amino-D-glucopyrano)-imidazolidine.

*Example 10*

6 g. of the 1-ethyl-2-thiono-3-(3',4-dichlorophenyl)-4,5-(6''-O-tosyl-D-glucopyrano) - imidazolidine obtained according to Example 9(b) and 6 ml. of 35% methylamine in 60 ml. of 95% ethanol are refluxed for 4 hours. The reaction mixture is then cooled, concentrated in vacuo at 40° and the oily residue which remains is exhaustively extracted with hot 10% methanol. The solution so obtained is clarified with active charcoal, the charcoal is then filtered off and the filtrate, while still warm, is made alkaline with saturated sodium carbonate solution.

After completely cooling, the product which precipitates is filtered off under suction and recrystallised from 50% methanol. The 1 - ethyl-2-thiono-3-(3',4'-dichlorophenyl) - 4,5 - (6" - deoxy-6"-methylamino-D-glucopyrano)-imidazolidine obtained melts at 120.5–121°.

$[\alpha]_D^{24}$: +22.9° (c.=1.06 in DMF)

On using 35% ethylamine, the following are obtained in an analogous manner:

1-ethyl-2-thiono-3-(3',4'-dichlorophenyl)-4,5-(6" - deoxy-6"-ethylamino - D - glucopyrano)-imidazolidine, M.P. 173–174° (from 50% methanol), $[\alpha]_D^{23}$: +26.0° (c.=1.079 in DMF), and on using 35% n-propylamine; 1-ethyl-2-thiono-3-(3',4' - dichlorophenyl)-4,5-(6"-deoxy-6"-n-propylamino-D-glucopyrano) - imidazolidine is obtained. M.P. 165–167° (from 50% methanol), $[\alpha]_D^{22}$: +22.2°

(c.=1.09 in DMF)

On reacting the tosyl esters of 1-ethyl-2-thiono-3-(4'-chlorophenyl)-4,5-D-glucopyrano-imidazolidine or of 1-ethyl-2-thiono-3-(4'-methoxyphenyl)-4,5 - D - glucopyrano-imidazolidine produced analogously to Example 9(b) with the corresponding amines the following compounds are also obtained in an analogous way: 1-ethyl-2-thiono-3-(4'-chlorophenyl)-4,5-(6"-deoxy-6"-methylamino - D-glucopyrano)-imidazolidine, M.P. 153–154° (from 50% methanol), $[\alpha]_D^{24}$: L 17.7° (c.=1.14 in DMF);

1-ethyl-2-thiono-3-(4'-chlorophenyl)-4,5-(6" - deoxy-6"-ethyl-amino - D - glucopyrano) - imidazolidine, M.P. 180–181° (from 50% methanol), $[\alpha]_D^{24}$: +17.7° (c.=1.01 in DMF)

1-ethyl-2-thiono-3-(4'-methoxyphenyl)-4,5 - (6" - deoxy-6"-methyl-amino-D-glucopyrano)-imidazolidine, M.P. 146° (from 50% methanol, obtained as semi-hydrate), $[\alpha]_D^{24}$: L 15.6° (c.=1.043 in DMF);

1-ethyl-2-thiono-3-(4'-methoxyphenyl) - 4,5 - (6"-deoxy-6"-n-propyl-amino - D - glucopyrano) - imidazolidine, M.P. 143° (from 50% methanol), $[\alpha]_D^{24}$: +11.4° (c.=0.948 in DMF)

*Example 11*

A solution of 1 g. (0.00246 mol) of 1-methyl-2-thiono-3 - (3',4' - dichlorophenyl) - 4,5 - (6"-deoxy-6"-dimethylamino - D - glucopyrano) - imidazolidine and 0.143 g. (0.00123 mol) of fumaric acid in 100 ml. of abs. ethanol is boiled for 5 minutes and then concentrated in vacuo at 30°.

50 ml. of abs. ethanol are added to the oil which remains and the whole is again evaporated to dryness in vacuo at 30°. A colourless, glassy, strongy hygroscopic residue is obtained which becomes liquid on standing in the air. The neutral fumarate of 1-methyl-2-thiono-3-(3',4' - dichlorophenyl)-4,5-(6"-deoxy-6"-dimethylamino-D-glucopyrano)-imidazolidine so obtained crystallises from abs. isopropanol with 1 mol of crystal water. It has no melting point. In a tube the ends of which have been sealed by melting, it sinters at 115° without melting; (dried for 15 hours at 110° under high vacuum over phosphorus pentoxide). $[\alpha]_D^{24}$: +44.1° (c.=1.08 in DMF).

On using methanol as solvent, the hydrochloride of 1-ethyl - 2 - thiono-3-(3',4'-dichlorophenyl)-4,5-(6"-deoxy-6" - n-propylamino-D-glucopyrano)-imidazolidine is obtained in an analogous manner. It has no definite melting point but turns brown at over 200° and decomposes at 210°, (dried for 15 hours at 80° under high vacuum over phosphorus pentoxide, recrystallised from methanol). $[\alpha]_D^{22}$: +62.6° (c.=0.86 in DMF).

*Example 12*

(a) 5.1 g. of 1-ethyl-2-thiono-3-(4'-methoxyphenyl)-4,5-(6"-O-tosyl-D-glucopyrano)-imidazolidine and 2 g. of sodium azide in 30 ml. of dimethyl sulphoxide are heated for 15 minutes on a boiling water bath. The reaction solution so obtained is poured into about 250 ml. of ice water whereupon the crude azide precipitates after a short time. It is filtered off under suction and washed with a little cold water. On recrystallising twice from 20% methanol and decolouring with active charcoal, pure 1-ethyl - 2-thiono-3-(4'-methoxyphenyl)-4,5-(6"-deoxy-6"-azido - D - glucopyrano) - imidazolidine is obtained, M.P. 141–143°, $[\alpha]_D^{22}$: +96.8° (c.=0.96 in DMF).

On reacting 1 - ethyl-2-thiono-3-(3',4'-dichlorophenyl)-4,5-(6"-O-tosyl-D-glucopyrano)-imidazolidine with sodium azide in dimethyl sulphoxide in an analogous manner, 1 - ethyl-2-thiono-3-(3',4'-dichlorophenyl)-4,5-(6"-deoxy-6"-azido-D-glucopyrano)-imidazolidine is obtained, M.P. 124–125° (from 50% ethanol), $[\alpha]_D^{22}$: +101.7° (c.=1.06 in DMF).

(b) 1.8 g. of the azide obtained according to (a) in 100 ml. of abs. ethanol are catalytically hydrogenated at room temperature and normal pressure using 2 g. of Raney nickel as catalyst. After 3½ hours, the hydrogenation has ended and the desired amine has already precipitated. The product is again dissolved by heating to about 50°, the catalyst is filtered off and the filtrate is evaporated in vacuo. Recrystallisation of the residue from ethanol yields pure 1 - ethyl-2-thiono-3-(4'-methoxyphenyl)-4,5-(6"-deoxy-6"-amino-D-glucopyrano)-imidazolidine, M.P. 167–169°. $[\alpha]_D^{20}$: +31.7° (c.=1.06 in DMF).

On catalytically hydrogenating 1 - ethyl-2-thiono-3-(3', 4' - dichlorophenyl) - 4,5 - (6" - deoxy-6"-azido-D-glucopyrano)-imidazolidine in abs. ethanol using Raney nickel as catalyst, 1-ethyl-2-thiono-3-(3',4'-dichlorophenyl)4,5-(6"-deoxy-6"-amino-D-glucopyrano)-imidazolidine is obtained in an analogous way. The hygroscopic substance (it does not contain any crystal water) sinters at 85°, at 90–91° it forms a clear melt, at 107° it again becomes solid and finally melts at 162–163° (dried for 15 hours over phosphorus pentoxide at 80° under high vacuum, recrystallised from 50% methanol). $[\alpha]_D^{22}$: +37.6° (c.=1.2 in DMF).

In order to demonstrate the excellent anti-phlogistic activity of compounds according to the invention, the compounds A and B, listed in column 1 of Tables I and II below, were used in tests with formulin-induced edema and formalin-induced peritonitis described in the following Experiments I and II, respectively.

EXPERIMENT I

The test compounds were injected intraperitoneally in a dosis of 50 mg. per kg. of body-weight into a group of 20 rats weighing about 120 g. each. Five minutes after the administration of the test compound, one hind paw of each rat was injected with 0.1 ml. of an aqueous 0.75%-formaldehyde solution in order to cause an inflammation. Two hours after this injection the extent of swelling was determined by comparison of the inflamed and the normal hind paw of each rat by one of the following equivalent methods giving strictly comparable results.

For volumetrical evaluation each hind paw of each rat was dipped into a fairly narrow tube filled to the top with water and after the paw was withdrawn, the volume of water necessary to bring the content of the tube to its original level was measured, i.e. water was added by means of a micro pipette. In order to obtain the most accurate measure results possible the measurements of said inflamed hind paw were each taken three times, the animals being kept under short ether narcosis during the process. The extent to which the paw had to be dipped was fixed by a little clip placed just above the malveolus. The extent of swelling was calculated from the difference in volume between the two paws of each animal.

For gravimetrical evaluation, the animals were sacrificed 2 hours after formaldehyde injection. Their hind paws were amputated, weighed and the extent of swelling then again calculated from the difference in weight between the two paws of each animal.

For both tests, separate control series with 40 animals each were run in order to determine the extent of swelling attained by the injection of formaldehyde without previous administration of a test compound.

The reduction of swelling attained with each substance was calculated in percent as the difference of the average swelling between the control animals and the test animals when the former (control animals) were taken as 100%.

TABLE I

| Test Compound: | Reduction of Swelling in Percent |
|---|---|
| (A) 2-thiono-3-(3',4'-dichloro-phenyl)-4,5-(6"-diethylamino-D-glucopyrano)-imidazolidine.[1] | 66 |
| (B) 2-thiono-3-(3',4'-dichlorophenyl)-4,5-(6"-dimethylamino-D-glucopyrano)-imidazolidine.[2] | 32 |

[1] According to Example 1 of the instant application.
[2] According to Example 3 of the instant application.

EXPERIMENT II

A series of 20 white, male rats of 120–140 g. of weight were injected intraperitoneally with 1 ml. per 100 g. of weight of an aqueous 1%-solution of formaldehyde solution. One hour after this injection, the test substance was administered through a stomach tube to the test animals in a dosage of 200 mg./kg. of bodyweight in the form of a 2%-suspension of the test substance in tragacanth. After nine hours the animals were sacrificed and the amount of exsudate was determined. The antiphlogistic activity was evaluated by the average diminution of a series of treated rats compared with a series of untreated ones. The results are shown in Table II below:

TABLE II

| Test Compound: | Reduction of Exsudate-amount Percent |
|---|---|
| (A) | 48 |
| (B) | 39 |

In order to demonstrate the analgesic activity of compounds A and B, the method of G. Woolfe and A. D. McDonald (J. Pharmacol. Exp. Therap. 80, 300 (1944)) was employed.

Pain was induced in groups of albino mice—each group consisting of 20 animals weighing, individually, from 14 to 18 grams—by placing the animals in a vessel, the bottom of which consisted of a hot plate, heated to 56° C. The reaction time, i.e. the time from the beginning of the exposure of each animal to the observation of pain reaction, namely rising on its hind paws, licking and shaking its front paws or jumping, was determined. This reaction time was measured twice prior to oral application of the test substance. 400 mg. of the test compound per kg. of bodyweight of the animals were administered through a stomach tube in the form of a 2%-emulsion in tragacanth, and the the reaction time was again determined to the latter at a time of 30, 35, 60, 90 and 120 minutes after such application.

In the following Table III, the reaction time after administration of the test compound is given in percent of the data obtained prior to administration. The intensity of analgesic activity is represented by the mean value of the data obtained during the first hour after application of the test compound.

TABLE III

| Test Compound: | Increase in Reaction Time in Percent of Initial Time |
|---|---|
| (A) 2 - thiono - 3 - (3',4' - dichlorophenyl)-4,5 - (6" - deoxy - 6" - diethylamino) - D-glucopyrano-imidazolidine.[1] | 25 |
| (B) 2 - thiono - 3 - (3',4' - dichlorophenyl)-4,5 - (6" - deoxy - 6" - dimethylamino - D-glucopyrano) - imidazolidine.[2] | 34 |

[1] According to Example 1 of the instant application.
[2] According to Example 3 of the instant application.

We claim:
1. A member selected from the group consisting of a compound of the formula

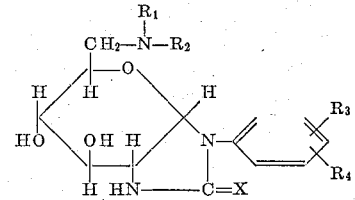

and the non-toxic, pharmaceutically acceptable acid addition salts thereof, in which formula,
each of $R_1$ and $R_2$ is a member selected from the group consisting of hydrogen and lower alkyl, and
$R_1$ and $R_2$ taken together with the nitrogen atom to which they are linked, form a member selected from the group consisting of morpholino, piperidino, pyrrolidino and hexamethyleneimino,
$R_3$ is a member selected from the group consisting of lower alkyl, lower alkoxy, chlorine, bromine, fluorine, trifluoromethyl and nitro,
$R_4$ is a member selected from the group consisting of hydrogen, lower alkyl and chlorine, and
X is a member selected from the group consisting of oxygen and sulfur.

2. 2 - thiono - 3 - (3',4' - dichlorophenyl) - 4,5 - (6"-deoxy-6"-diethylamino-D-glucopyrano)-imidazolidine.

3. 2 - thiono - 3 - (3',4' - dichlorophenyl) - 4,5 - (6"-deoxy-6"-dimethylamino-D-glucopyrano)-imidazolidine.

4. 2 - thiono - 3 - (3',4' - dimethylphenyl) - 4,5 - (6"-deoxy-6"-diethylamino-D-glucopyrano)-imidazolidine.

5. 2 - thiono - 3 - (3',4' - dimethylphenyl) - 4,5 - (6"-deoxy-6"-dimethylamino-D-glucopyrano)-imidazolidine.

6. 2 - thiono - 3 - (3' - chloro - 4' - methylphenyl) - 4,5-(6" - deoxy - 6" - dimethylamino - D - glucopyrano)-imidazolidine.

7. 2 - thiono - 3 - (3' - chloro - 4' - methylphenyl) - 4,5-(6" - deoxy - 6" - diethylamino - D - glucopyrano)-imidazolidine.

8. 2 - thiono - 3 - (3',4' - dichlorophenyl) - 4,5 - (6"-deoxy-6"-morpholino-D-glucopyrano)-imidazolidine.

9. 2 - thiono - 3 - (3',4' - dichlorophenyl) - 4,5 - (6"-deoxy-6"-piperidino-D-glucopyrano)-imidazolidine.

10. 2 - thiono - 3 - (3',4' - dichlorophenyl) - 4,5 - (6"-deoxy-6"-amino-D-glucopyrano)-imidazolidine.

11. 2 - thiono - (4' - methoxyphenyl) - 4,5 - (6"-deoxy-6"-diethylamino-D-glucopyrano)-imidazolidine.

12. 2 - oxo - 3 - (3',4' - dichlorophenyl) - 4,5 - 6"-deoxy-6"-diethylamino-D-glucopyrano)-imidazolidine.

13. 2 - oxo - 3 - (3',4' - dichlorophenyl) - 4,5 - (6"-deoxy-6"-dimethylamino-D-glucopyrano)-imidazolidine.

14. A member selected from the group consisting of a compound of the formula

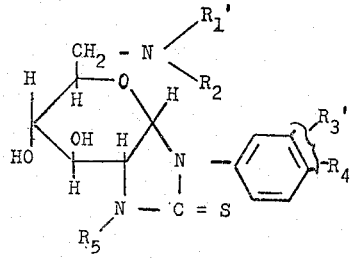

and the non-toxic, pharmaceutically acceptable acid addition salts thereof, in which formula
$R_1'$ is a member selected from the group of hydrogen, lower alkyl and di-lower alkylamino-lower alkyl, $R_2$ is a member selected from the group consisting of hydrogen and lower alkyl, and $R_1'$ and $R_2$ taken together with the nitrogen atom to which they are attached, form a member selected from the group consisting of morpholino, piperidino, pyrrolidino and hexamethyleneimino, $R_3'$ is a member selected from the group consisting of lower alkyl, lower alkoxy, halogen of an atomic number not exceeding 35, and trifluoromethyl, $R_4$ is a member selected from the group consistiing of hydrogen, lower alkyl and chlorine, and $R_5$ represents lower alkyl.

15. 1 - methyl - 2 - thiono - 3 - (3',4' - dichlorophenyl)- 4,5 - (6" - deoxy - 6" - dimethylamino - D - glucopyrano)-imidazolidine.

16. 1 - ethyl - 2 - thiono - 3 - (3',4' - dichlorophenyl)- 4,5 - (6" - deoxy - 6" - dimethylamino - D - glucopyrano)-imidazolidine.

17. 1 - ethyl - 2 - thiono - 3 - (4' - methoxyphenyl)- 4,5 - (6" - deoxy - 6" - n - propylamino - D - glucopyrano)-imidazolidine.

18. 1 - ethyl - 2 - thiono - 3 - (3',4' - dichlorophenyl)- 4,5 - (6" - deoxy - 6" - n - propylamino - D - glucopyrano)-imidazolidine.

No references cited.

LEWIS GOTTS, *Primary Examiner.*

JOHNNIE R. BROWN, *Assistant Examiner.*

UNITED STATES PATENT OFFICE
CERTIFICATE OF CORRECTION

Patent No. 3,309,357                    March 14, 1967

Charles J. Morel et al.

It is hereby certified that error appears in the above numbered patent requiring correction and that the said Letters Patent should read as corrected below.

Column 5, line 69, for "means" read -- meant --; column 9, line 26, for "30" read -- 3° --; column 10, line 17, for "DD" read -- D --; line 52, for "water," read -- water), --; lines 69 and 70, strike out "composition); $[\alpha]^{23°}_D$ :+ 20.0° (c.=1.07 in DMF). composition); $[\alpha]_D^{23}$ :+ 20.0°( c.=1.07 in DMF)." and insert instead -- pyrano)-imidazolidine is obtained, M.P. 144-145° (decomposition); $[\alpha]_D^{23}$:+ 20.0° (c.=1.07 in DMF). --; column 11, line 35, for "1,5" read -- 4,5 --; line 39, for "deoxy-" read -- deoxy-6″ --; column 12, line 13, for "148°" read -- 149° --; column 15, line 15, for "(A) 2-thiono-3-(3′,4′-dichloro-phenyl)-4,5-( 6″-di-" read -- (A) 2-thiono-3-(3′,4′-dichlorophenyl)-4,5-(6″-deoxy-6″-di- --; line 17, for "(B) 2-thiono-3-(3′,4′-dichlorophenyl)-4,5-(6″-di-" read -- (B) 2-thiono-3-(3′,4′-dichlorophenyl)-4,5-(6″-deoxy-6″-di- --; column 16, lines 9 to 16, the extreme right-hand portion of the formula should appear as shown below instead of as in the patent:

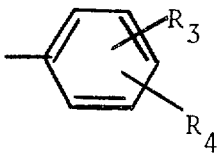

Signed and sealed this 6th day of August 1968.

(SEAL)
Attest:

EDWARD M. FLETCHER, JR.                    EDWARD J. BRENNER
Attesting Officer                          Commissioner of Patents